United States Patent [19]

Takamori

[11] Patent Number: 5,568,204
[45] Date of Patent: Oct. 22, 1996

[54] DIGITAL VIDEO SWITCHING APPARATUS

[75] Inventor: Tsutomu Takamori, Kanagawa, Japan

[73] Assignee: Sony Corporation, Tokyo, Japan

[21] Appl. No.: 391,018

[22] Filed: Feb. 21, 1995

[30] Foreign Application Priority Data

Feb. 23, 1994 [JP] Japan .................................. 6-025262

[51] Int. Cl.⁶ ........................ H04N 5/262; H04N 5/265; H04N 5/268
[52] U.S. Cl. ........................ 348/705; 348/708; 348/584
[58] Field of Search .................................... 348/705, 706, 348/720, 721, 660, 659, 708, 571, 586, 584, 590, 585, 599, 598, 587, 592, 453, 578; H04N 5/262, 5/265, 5/268, 5/272, 5/275

[56] References Cited

U.S. PATENT DOCUMENTS

| | | | |
|---|---|---|---|
| 4,746,982 | 5/1988 | Seen et al. | 348/705 |
| 5,038,220 | 8/1991 | Eguchi | 358/310 |
| 5,162,904 | 11/1992 | Beaulier et al. | 348/705 |
| 5,172,218 | 12/1992 | Wilkinson | 358/13 |
| 5,227,863 | 7/1993 | Bilbrey et al. | 348/585 |
| 5,253,043 | 10/1993 | Gibson | 348/720 |
| 5,347,622 | 9/1994 | Takemoto et al. | 348/590 |
| 5,426,467 | 6/1995 | Moriwake et al. | 348/584 |

*Primary Examiner*—Safet Metjahic
*Attorney, Agent, or Firm*—William S. Frommer; Alvin Sinderbrand

[57] ABSTRACT

A digital video switching apparatus is disclosed in which a 4:2:2 digital video signal and a 4:4:4 digital video signal supplied at input terminals are selected by switching by a matrix switcher unit in order to transmit the 4:2:2 digital video signal to a first signal processing unit and in order to transmit the 4:2:2 digital video signal to a second signal processing unit. The first signal processing unit converts the 4:4:4 digital video signal into the 4:2:2 digital video signal by signal processing, such as color correction. The second signal processing unit performs signal processing, such as mixing or wiping, on the 4:2:2 digital video signal and the 4:2:2 digital video signal directly supplied from the matrix switcher unit, in order to output the processed 4:2:2 digital video signal. The input terminals may be simultaneously employed as the input terminals for the 4:2:2 digital video signal and the input terminals for the 4:4:4 digital video signal, while there is no necessity of providing input terminals dedicated to the 4:4:4 digital video signal. On the other hand, a device for supplying the 4:2:2 digital video signal or a device for supplying the 4:4:4 digital video signal may be connected to the input terminals so that the 4:2:2 digital video signal and the 4:4:4 digital video signal will be arbitrarily switched and selected by the matrix switcher unit or otherwise employed in combination.

3 Claims, 3 Drawing Sheets

DIGITAL VIDEO SWITCHING APPARATUS

BACKGROUND OF THE INVENTION

This invention relates to a digital video switching apparatus (switcher) for selecting and outputting a desired digital video signal from among a plurality of input digital video signals. More particularly, it relates to a digital video switcher handling both the digital video signal having the data rate for luminance and chrominance signals of 4:2:2 and the digital video signal having the data rate for luminance and chrominance signals of 4:4:4.

There has generally been known a digital video switcher handling a D1-format digital video signal having the data rate for the luminance signal Y and the chrominance signals U and V of 4:2:2, referred to herein as the 4:2:2 digital video signal. It is not possible with this type of the digital video switcher to process a digital video signal having the Y:U:V ratio of 4:4:4, referred to herein as the 4:4:4 digital video signal, because its internal signal processing hardware, such as a wipe or a chroma key, has the capability of processing only the 4:2:2 video signal. It is however desired of such digital video switcher to be capable of processing the 4:4:4 digital video signal as the source video signal as well.

OBJECT AND SUMMARY OF THE INVENTION

It is an object of the present invention to provide a digital video switching apparatus capable of handling both a digital video signal having a data rate for the luminance signal and the chrominance signal of 4:4:4 and a digital video signal having a data rate for the luminance signal and the chrominance signal of 4:2:2.

It is another object of the present invention to provide a digital video switching apparatus in which there is no necessity of changing the wiring in case of a source apparatus being changed over and in which facilitated control of the matrix switcher unit may be achieved.

According to the present invention, there is provided a digital video switching apparatus having a matrix switcher unit having a plurality of input buses respectively connected to a plurality of input terminals and a plurality of output buses selectively connected to respective ones of the input buses, and a first signal processing unit connected to two of the output buses selectively connected to two of the input buses supplied with a 4:2:2 digital video signal and a 0:2:2 digital video signal together making up a 4:4:4 digital video signal. The first signal processing unit performs signal processing on the 4:4:4 digital video signal at a rate of 4:4:4 for outputting a corresponding 4:2:2 digital video signal. The video switching apparatus also has a second signal processing unit connected to one of the output buses selectively connected to one of the input buses supplied with the 4:2:2 digital video signal and to the first signal processing unit. The second signal processing unit performs signal processing on the 4:2:2 digital video signal supplied via the input bus and on the 4:2:2 digital video signal supplied from the first signal processing unit for outputting a corresponding 4:2:2 digital video signal.

The first signal processing unit may include a chroma key for generating a 4:2:2 foreground signal and a 4:0:0 key signal from the 4:2:2 digital video signal and the 0:2:2 digital video signal.

The first signal processing unit may include a color corrector for generating a 4:2:2 digital video signal from the 4:2:2 digital video signal and the 0:2:2 digital video signal.

According to the present invention, the 4:4:4 video signal supplied via at least two of plural output buses of the matrix switcher unit connected to the input terminals is processed by a first signal processing unit to produce a 4:2:2 video signal which is fed to the second signal processing unit. The second signal processing unit processes a 4:2:2 video signal supplied via output buses of the matrix switcher unit other than those connected to the first signal processing unit, and the 4:2:2 video signal supplied from the first signal processing unit, in order to output a 4:2:2 video signal.

With the digital video switching apparatus according to the present invention, the input terminals can be used simultaneously for receiving the 4:2:2 video signal and the 4:4:4 video signal, while there is no necessity of providing input terminals dedicated to the 4:4:4 video signal. On the other hand, the device for supplying the 4:2:2 video signal and the device for supplying the 4:4:4 video signal may be connected to the input terminals so that the 4:4:4 video signal can be arbitrarily switched to the 4:2:2 video signal or vice versa by the matrix switcher unit. Alternatively, the two video signals can be used in combination. In addition, since the matrix switcher unit for input selection is enclosed in the digital video switching apparatus, there is no necessity of controlling the external pre-matrix for input selection such that control may be achieved positively by a simplified control system. Since the pre-matrix may be eliminated, the apparatus may be improved in operability and reliability, while its production cost may be lowered.

Thus the present invention provides a digital video switching apparatus which is high in versatility and can be controlled easily without the necessity of providing input terminals dedicated to the 4:4:4 video signal.

BRIEF DESCRIPTION OF THE PREFERRED EMBODIMENT

Figure 1:
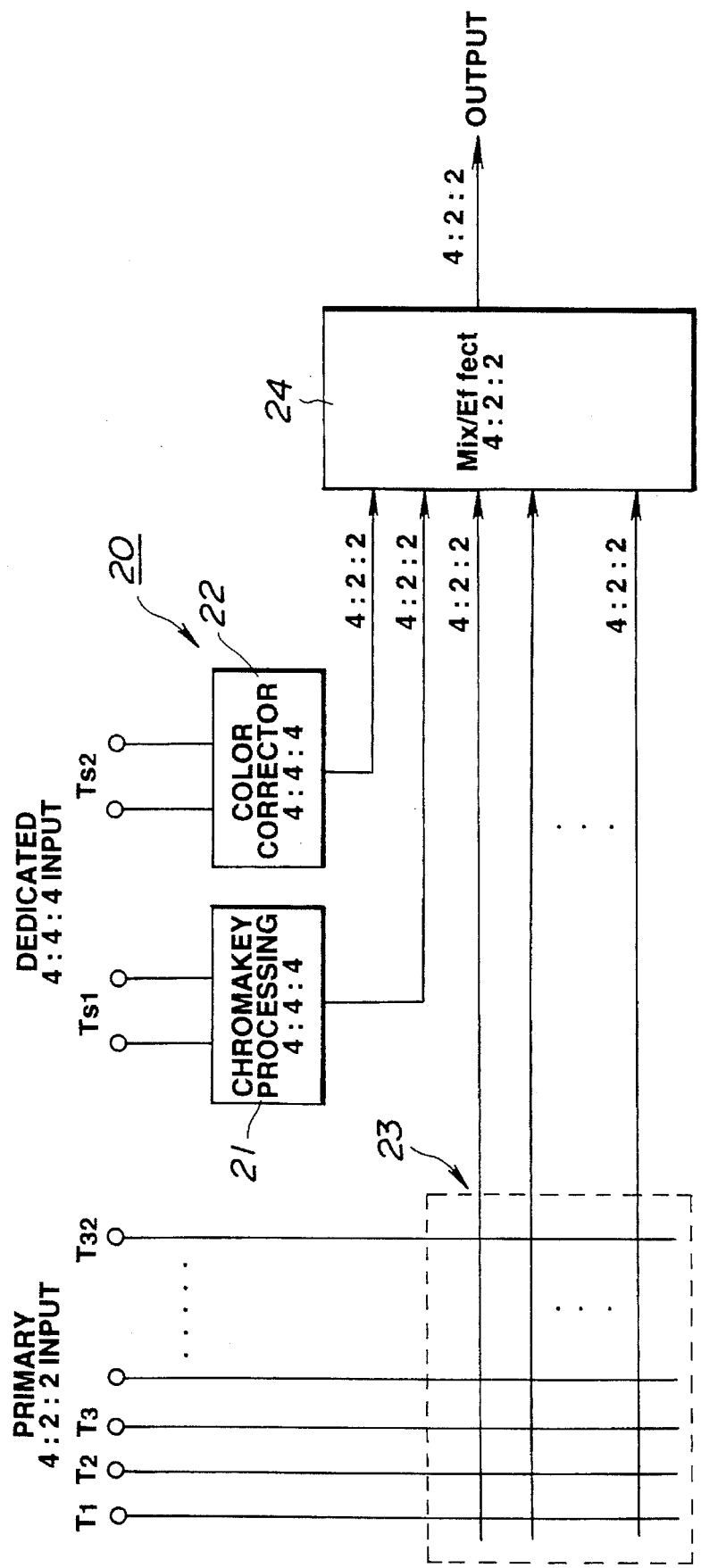
FIG. 1 is a block diagram showing a digital video switcher having pertinence to the present invention.

Before proceeding to description of the present invention, a digital video switcher having pertinence to the present invention is explained by referring to FIG. 1.

A digital video switcher 20 shown in FIG. 1 is a digital video switcher for the 4:2:2 video signal. This digital video switcher 20 includes a chroma key processing unit 21 for processing the 4:4:4 video signal and a color corrector 22. That is, in addition to primary input terminals $T_1$ to $T_{32}$ connected via a matrix switcher unit 23 to an effect switcher 24 for the 4:2:2 video signal, input terminals $T_{s1}$ and $T_{s2}$ dedicated to the 4:4:4 video signal are provided and connected to a chroma key processing unit 21 and to a color corrector 22 for processing the 4:4:4 video signal. The 4:4:4 video signal supplied to the input terminals $T_{s1}$ and $T_{s2}$ dedicated to the 4:4:4 video signal is converted via the chroma key processing unit 21 and the color corrector 22 into the 4:2:2 video signal which then enters an effect switcher unit 24 for the 4:2:2 video signal as the 4:2:2 video signal. The effect switcher unit 24 processes the desired 4:2:2 video signal, supplied thereto via the matrix switcher unit 23 from the primary input terminals $T_1$ to $T_{32}$, with mixing or wiping etc., and outputs the processed 4:2:2 video signal.

It is only the equipment connected to the input terminals $T_{s1}$ and $T_{s2}$ that can be employed as being connected to the chroma key processing unit 21 and the color corrector 22. Thus, rewiring is required when changing over the source device supplying the 4:4:4 video signal from e.g., a telecine device to a camera.

Thus the digital video switcher 20, shown in FIG. 1, provided with the input terminals $T_{s1}$ and $T_{s2}$ dedicated to the 4:4:4 video signal, lacks in versatility, and is in need of re-wiring in case of changing a source device for the 4:4:4 video signal from e.g., a telecine device to a camera.

Figure 2:
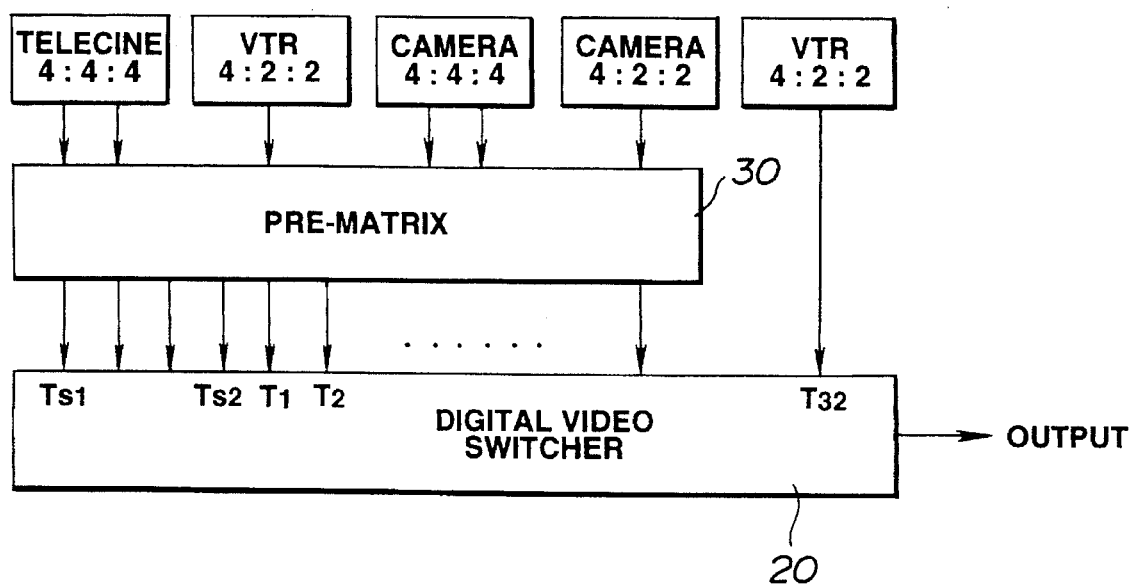
FIG. 2 is a block diagram showing another digital video switcher having pertinence to the present invention.

For overcoming such inconvenience, it may be envisaged to provide a pre-matrix 30 externally of the digital video switcher 20 for selecting inputs outside of the digital video switcher 20, as shown in FIG. 2. Although the re-wiring is unnecessary with the arrangement of FIG. 2, the control system becomes highly complex because the switching of the inputs and outputs in the pre-matrix 30 provided outside of the digital video switcher 20 needs to be performed under control by the digital video switcher 20. That is, since the control signal for switching needs to be transmitted from the digital video switcher 20 to the pre-matrix 30, there is produced a delay in the switching timing, and hence it becomes necessary to design the control system so that such delay in the changeover timing will be taken into account.

Thus the present invention provides a digital video switcher 10 in which the pre-matrix 30 as shown in FIG. 2 is not employed and in which both the 4:2:2 digital video signal and the 4:4:4 digital video signal may be processed without providing dedicated input terminals for the 4:4:4 digital video signal.

Figure 3:
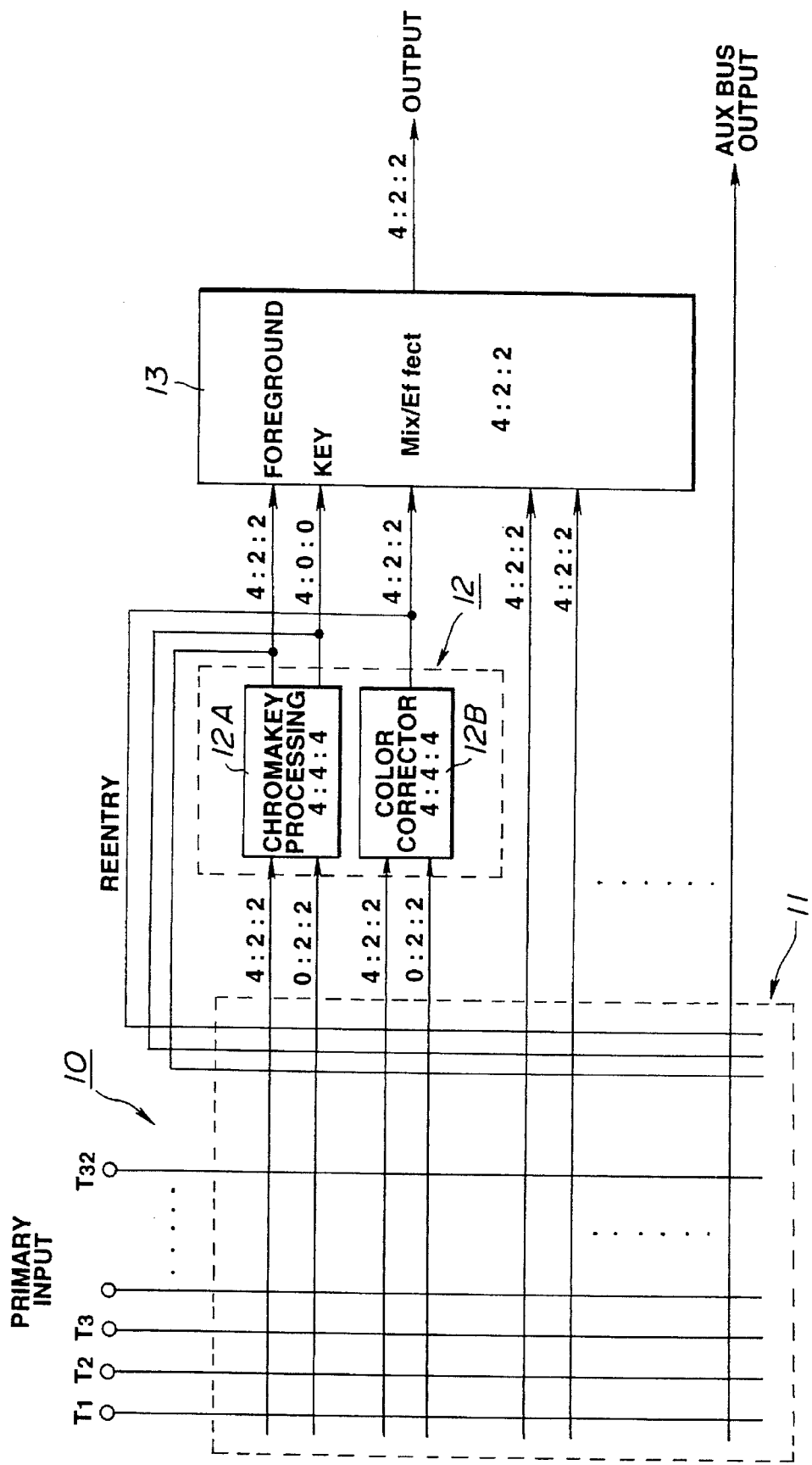
FIG. 3 is a block diagram showing a digital video switcher according to the present invention.

FIG. 3 shows such digital video switcher 10 according to the present invention.

The digital video switcher 10 is adapted to handle both the 4:2:2 digital video signal, that is the digital video signal having the data rate for the luminance signal and the chrominance signal of 4:2:2, and the 4:4:4 digital video signal, that is the digital video signal having the data rate for the luminance signal and the chrominance signal of 4:4:4, and includes primary input terminals $T_1$ to $T_{32}$ supplied with the 4:2:2 video signal and the 4:4:4 digital video signal. To these primary input terminals $T_1$ to $T_{32}$ are connected a first signal processor 12 and a second signal processor 13 via a matrix switcher unit 11.

At least two of plural output buses of a matrix switcher unit 11 are connected to a first signal processor 12 adapted for processing the 4:4:4 video signal for outputting the 4:2:2 video signal. The first signal processor 12 of the present embodiment includes a chroma key processing unit 12A and a color corrector 12B respectively connected to two output buses and other two output buses of the matrix switcher unit 11.

That is, the 4:4:4 video signal is supplied as e.g., a 4:2:2 video signal and a 0:2:2 video signal to two of the primary input terminals $T_1$ to $T_{32}$, so as to enter the chroma key processing unit 12A and the color corrector 12B of the first signal processing unit 12 via two of the input buses of the matrix switcher unit 11 associated with the two of the input terminals $T_1$ to $T_{32}$ and via two of output buses of the matrix switcher unit 11 respectively connected to the two input buses.

The chrome key processing unit 12A processes the 4:4:4 video signal, supplied thereto from the primary input terminals $T_1$ to $T_{32}$ via the matrix switcher unit 11, at a data rate of 4:4:4, and transmits the 4:2:2 foreground signal and the 4:0:0 key signal to a second signal processing unit 13. The color corrector 12B performs color correction, at a data rate of 4:4:4, on the 4:4:4 video signal supplied from the primary input terminals $T_1$ to $T_{32}$ via the matrix switcher unit 11, and converts the corrected 4:4:4 video signal into the 4:2:2 video signal which is supplied to the second signal processor unit 13. The chroma key processing unit 12A or the color corrector 12B extracts specified color components, by taking advantage of the color difference, and generates a so-called key signal. The chroma key processing unit 12A performs processing at a data rate of 4:4:4 for generating the chroma key foreground signal and the key signal from the 4:4:4 video signal having the broad bandwidth of the color signal. In this manner, a high precision key signal can be generated which enables extraction of a fine picture pattern. By performing color extinction processing at the data rate of 4:4:4 and subsequently generating the 4:2:2 foreground signal, it becomes possible to reduce the effects of distortion by non-linear processing or aliasing in order to produce the foreground signal of high picture quality.

The 4:2:2 video signal supplied from the primary input terminals $T_1$ to $T_{32}$ and the 4:4:4 video signal supplied via the primary input terminals $T_1$ to $T_{32}$ and the matrix switcher unit 11 and subsequently processed by the first signal processing unit 12 are processed by the second signal processor 13 with mixing or wiping for outputting the processed 4:2:2 video signal.

The matrix switcher unit 11 has re-entry signal paths in order to permit outputs of the chroma key processing unit 12A or the color corrector 12B to be used as other inputs to the second signal processing unit 13 or an auxiliary bus.

With the above-described digital video switcher 10, the primary input terminals $T_1$ to $T_{32}$ are connected via the matrix switcher unit 11 to the first signal processor 12 for the 4:4:4 video signal and to the second signal processor 13 for the 4:2:2 video signal, so that any of the primary input terminals $T_1$ to $T_{32}$ may be used as input terminals for the 4:4:4 video signal. Consequently, there is no necessity of providing input terminals dedicated to the 4:4:4 video signal. On the other hand, the device for supplying the 4:2:2 video signal or the device for supplying the 4:4:4 video signal may be connected to the primary input terminals $T_1$ to $T_{32}$ for optionally switching the 4:4:4 video signal to the 4:2:2 video signal or vice versa or employing the two video signals in combination.

The operation of the matrix switcher unit 11 and the first and second signal processing units 12, 13 is controlled by a control unit, not shown. Since the matrix switcher unit 11 for input selection is enclosed in the present digital video switcher 10, there is no necessity of controlling the pre-matrix for external input selection and hence positive control may be realized by a simplified control system. Since the pre-matrix is not required, the digital video switcher is simplified in construction and low in production cost, while being excellent in operability or reliability.

Although only the 4:4:4 digital video signal is adapted to enter the first signal processing unit 12A and the color corrector 12B of the first signal processing unit 12 shown in FIG. 3, the 4:2:2 digital video signal may also be adapted to enter the unit 12A and the color corrector 12B selectively. In such case, the input 4:2:2 digital video signal may be converted by up-rate conversion into the 4:4:4 digital video signal for processing by chroma key generation and color correction.

What is claimed is:

1. A digital video switching apparatus comprising:

a matrix switcher unit having a plurality of input buses respectively connected to a plurality of input terminals and a plurality of output buses selectively connected to respective ones of the input buses;

a first signal processing unit connected to two of said output buses selectively connected to two of said input buses supplied with a 4:2:2 digital video signal and a 0:2:2 digital video signal together making up a 4:4:4 digital video signal, said first signal processing unit performing signal processing on said 4:4:4 digital video signal at a rate of 4:4:4 for outputting a corresponding 4:2:2 digital video signal and a second signal processing unit connected to one of the output buses selectively connected to one of the input buses supplied with the 4:2:2 digital video signal and to said first signal processing unit, said second signal processing unit performing signal processing on the 4:2:2 digital video signal supplied via said input bus and on the 4:2:2 digital video signal supplied from the first signal processing unit for outputting a corresponding 4:2:2 digital video signal.

2. The digital video switching apparatus as claimed in claim 1, wherein said first signal processing unit comprises a chroma key generator for generating a 4:2:2 foreground signal and a 4:0:0 key signal from said 4:2:2 digital video signal and said 0:2:2 digital video signal.

3. The digital video switching apparatus as claimed in claim 1, wherein said first signal processing unit comprises a color corrector for generating a 4:2:2 digital video signal from said 4:2:2 digital video signal and said 0:2:2 digital video signal.

* * * * *